US006865583B2

United States Patent
Stockley

(10) Patent No.: US 6,865,583 B2
(45) Date of Patent: Mar. 8, 2005

(54) ELECTRONICS ASSEMBLY ENGINEERING SYSTEM EMPLOYING NAMING AND MANIPULATION FUNCTIONS FOR USER DEFINED DATA STRUCTURES IN A DATA SYSTEM USING TRANSACTION SERVICE

(75) Inventor: Brian Henry Stockley, Johnson City, TN (US)

(73) Assignee: Siemens Dematic Electronics Assembly Systems, Inc., Alpharetta, GA (US)

( * ) Notice: Subject to any disclaimer, the term of this patent is extended or adjusted under 35 U.S.C. 154(b) by 374 days.

(21) Appl. No.: 09/805,722

(22) Filed: Mar. 12, 2001

(65) Prior Publication Data
US 2001/0037338 A1 Nov. 1, 2001

Related U.S. Application Data
(60) Provisional application No. 60/188,964, filed on Mar. 10, 2000.

(51) Int. Cl.[7] .............................................. G06F 17/30
(52) U.S. Cl. ...................................... 707/202; 707/203
(58) Field of Search ................................ 707/202, 203, 707/100–103; 715/511, 530; 717/110; 369/30.05, 47.12, 47.13, 83

(56) References Cited

U.S. PATENT DOCUMENTS

| | | | | |
|---|---|---|---|---|
| 4,996,685 A | * | 2/1991 | Farese et al. ................ 370/352 |
| 5,339,392 A | * | 8/1994 | Risberg et al. ............. 345/762 |
| 5,517,606 A | | 5/1996 | Matheny et al. ............ 395/156 |
| 5,557,732 A | * | 9/1996 | Thompson ................... 715/705 |
| 5,774,717 A | * | 6/1998 | Porcaro ....................... 707/202 |
| 5,838,317 A | * | 11/1998 | Bolnick et al. ............. 345/764 |
| 5,838,973 A | * | 11/1998 | Carpenter-Smith et al. . 717/105 |
| 5,841,420 A | * | 11/1998 | Kaply et al. ................ 345/421 |
| 5,862,379 A | * | 1/1999 | Rubin et al. ................ 717/109 |
| 5,920,711 A | * | 7/1999 | Seawright et al. ............ 703/15 |
| 6,006,242 A | | 12/1999 | Poole et al. ................. 707/531 |
| 6,035,297 A | | 3/2000 | Van Huben et al. ............ 707/8 |
| 6,043,817 A | * | 3/2000 | Bolnick et al. ............. 345/788 |
| 6,115,711 A | * | 9/2000 | White .......................... 707/10 |
| 6,119,122 A | | 9/2000 | Bunnell ....................... 707/102 |
| 6,199,082 B1 | * | 3/2001 | Ferrel et al. ................ 715/522 |
| 6,321,374 B1 | * | 11/2001 | Choy .......................... 717/106 |
| 6,513,019 B2 | * | 1/2003 | Lewis .......................... 705/35 |
| 6,697,754 B1 | * | 2/2004 | Alexander .................. 702/119 |

FOREIGN PATENT DOCUMENTS

WO    WO 01/69375 A3    9/2001

OTHER PUBLICATIONS

Sharon Gaudin "Companies move to protect outgoing data", Feb. 1, 1999, vol. 33, p. 60.*

"Persistent Object Storage in the OS/2 Workplace Shell" IBM Technical Disclosure Bulletin, IBM Corp. New York US, vol. 37, No. 10—Oct. 1, 1994, pp. 313–314, XP000475678; ISSN: 0018–8689.

(List continued on next page.)

Primary Examiner—Uyen Le
Assistant Examiner—Hanh Thai

(57) ABSTRACT

The present invention provides novel naming and manipulation functions for user defined data structures in a data system using transaction service. In particular, in an electronics assembly engineering system having a computer subsystem in which user-defined data structures accessible to editor software have referential integrity and in which user modifications to the data structures during editing are made directly to the data structures rather than indirectly by way of a temporary file, the invention provides a method for permitting naming and manipulation of the data structures. The method includes the steps of (i) providing close, discard and rename functions for the data structures in the case where a newly-created data structure is being edited; (ii) providing close and copy functions for the data structures if an existing data structure is being edited; and (iii) excluding a save-as function for the data structures.

23 Claims, 5 Drawing Sheets

OTHER PUBLICATIONS

Stardock Systems: "Object Desktop Professional—User's Guide" Stardock Documentation, 1996, pp. 3.12, 4.1–4.7, XP002184063 Canton, MI, USA.

"OS/2 Version 2.0—Presentation Manager and Workplace Shell" Chambers, et al. OS/2 Version 2.0 Technical Compendium, No. GG24-3732-00, Apr. 1992 pp. 111–130—XP002184064, Boca Raton, FL; Chapter 8 "Workplace Shell Implementation", p. 1, p. 117, p. 121.

"The Evolution of ROSE: An Engineering Object–Oriented Database System"—Spooner, et al.—Computer Integrated Manufacturing, 1990, Proceedings of Renssalaer's Second International Conference on Troy, NY, USA; May 21–23, 1990, Los Alamitos, CA, USA, IEEE, Comput. Soc. US, pp. 16–23 XP010016936.

International Search Report.

* cited by examiner

ELECTRONICS ASSEMBLY ENGINEERING SYSTEM EMPLOYING NAMING AND MANIPULATION FUNCTIONS FOR USER DEFINED DATA STRUCTURES IN A DATA SYSTEM USING TRANSACTION SERVICE

CROSS-REFERENCE TO RELATED APPLICATIONS

This application claims benefit, under 35 U.S.C. § 119(e), from U.S. Provisional Patent Application No. 60/188,964, filed Mar. 10, 2000.

BACKGROUND OF THE INVENTION

The present invention generally concerns electronics assembly engineering systems. In particular, the invention concerns methods of permitting naming and manipulation functions for data structures in data systems using transaction service within the environment of an electronics assembly engineering system. In particular, the invention concerns an electronics assembly engineering system having a computer subsystem incorporating computer-readable media for performing the methods and functions of the invention.

Electronics assembly engineering systems for industrial applications require complex and sophisticated subsystems to control performance of each system and to account for changes in the application parameters and the industrial environment. Control has traditionally been provided by computer subsystems. Some computer subsystems use object-oriented databases and transaction service in controlling performance. SIPLACE (by Siemens Electronics Assembly Systems, Inc., 2875 Northwoods Parkway, Norcross, Ga. 30071 USA), a platform used in the control of the production of printed circuit boards, is an example of an electronics assembly engineering system employing a subsystem using transaction service. SIPLACE employs a programming software subsystem known as SIPLACE Pro, which uses transaction service (in particular, Microsoft Transaction Server) to create and manage data structures, such as objects, within an object-oriented database. Using SIPLACE Pro, programmers can control performance of various aspects of the system through a user-friendly graphical interface. However, in this instance, where the electronics assembly engineering system and computer subsystem employ transaction service and the data structures have referential integrity, programmers working with the system can no longer expect to manipulate the data structures in the same manner as they did in traditional file-based systems.

Microsoft Word is an example of a traditional file-based application working within the file-system of the Microsoft Windows operating system. A user can manipulate files in a directory/file management system, such as Windows Explorer™, or within an editor. Similar results can be achieved in each environment, although the presentation of the functions can be different. When working in the directory/file management system, the file-system is represented by a tree-control. When working in the editor, the user is often presented with a dialog representing the file-system when, for example, "Save As" is chosen from the "file" menu within the Microsoft Word application.

The basic functionality and menu functions of a typical prior art file-based editor are shown in the flowcharts of FIGS. 1 and 2. FIG. 1 shows the functionality and menu functions of a prior art file-based editor in the mode where a new file is being created. FIG. 2 shows the functionality and menu functions of a file-based editor in the mode where an existing file is being edited. With reference to FIGS. 1 and 2, the menu functions of a traditional file-based editor are characterized as follows:

Manipulating Files within the Traditional Directory/file Management System (Prior Art)

Opening a file: A file can be selected in the tree-control and opened either from the context menu or by double clicking (the default function from the context menu). The user's intention is very clear that the file is to be opened in the appropriate editor, i.e. Microsoft Word.

Creating a new file: A new file of a registered type can be created without opening the application by selecting New→<Filetype> from the context menu. This creates the file in the selected folder. The file assumes a default name but is highlighted ready for immediate renaming if the user chooses to.

Renaming a file: The file can be renamed by selecting it and then, once selected, selecting the text of the file name a second time or by selecting it once and choosing the rename function from the context menu. The text of the filename can be edited directly.

Copying a file: A file can be selected and copied by choosing "Copy" from the context menu or from main menu Edit→Copy then using the paste command to create the copy in the desired location within the folder structure. The system is smart enough to rename the file if it is copied to the same folder. The copy function can also be achieved by holding down the control key when a drag is initiated—a copy of the file is created in the folder where the drop is made. The user's intention is clear, a new copy of the file is to be created.

Moving a file: A file can be selected and the "Cut" function chosen from the context menu or main menu Edit→Cut then the paste command can be used to effectively move the file to a new location. The file icon and name remain "grayed out" until "Paste" is initiated. A file can be moved to a different folder by selecting it with a sustained left mouse button and then dragging and dropping it to the new location on the same drive. (If the destination is on a different drive then a copy of the file is made.)

Deleting a file: A file can be deleted by selecting it and then choosing the "Delete" function from the context menu or with the delete keyboard button.

Creating Shortcuts: Selecting the file then choosing the Create shortcut function from the context menus can create a shortcut. Once a shortcut has been made the user can open it, delete it, move it, copy it and rename it in much the same way as if it were the source file. A new shortcut can even be created. The important feature of a shortcut is that when it is opened it is the source object that is opened. A shortcut created from a shortcut is equivalent to a copy of the shortcut—both link directly to the source file. In all other respects a shortcut is an independent file (of a special type) within the file system. A user has no expectation that the source file will be deleted when the shortcut is deleted and, conversely, there is no expectation that the shortcuts pointing to a file will be deleted when the source file is deleted—the shortcuts remain pointing to nothing. Worse than that, if a source file is deleted then later on a new file is created with the same name then the shortcuts will become active again.

Manipulating Files within the Application (Prior Art)

Open: When "Open" is selected from the File menu a dialog is opened that allows the user to choose an existing file from the file system using a tree control.

New: When "New" is selected from the file menu the user can then select a template for the new document (including the blank document template). The application then creates a file with a default name and puts this in the editor window. This "file" does not really exist in the file-system at this point.

Save: "Save" is typically a background function. The user chooses "Save" from the File menu and the file in the files system is immediately updated with the contents of the editor. The only exception to this is when a file is saved for the first time after it is created which is described below.

Save As: "Save As" is a slightly ambiguous dialog as it covers about three separate functions in a rather clumsy manner.

Save As—Simple—Giving a new file a name: When a file is closed for the first time or when "Save" is chosen for the first time the user is presented with a dialog that shows the default name and the current folder. The user is free to change the text of the name or select another folder.

Save As—To make a copy: If an existing file is in the editor then the Save As dialog can be used to create a copy of the changed file under a different name or in a different folder. In doing this, the original file is left unchanged—the original file and the copy can have different contents at this point.

Save As—To overwrite another existing file: If Save As is selected from an open editor, whether the document is new or existing, it is possible to select an existing file from the file-system and save the document under that name. In this instance, the "Do you want to overwrite the existing file" message appears and the contents of the editor can be saved to the existing file. In this case, the contents of the original file may be unchanged and the overwritten file will have been completely changed. A special case exists when an existing file's own name is selected from this dialog this generally will have the same effect as Save.

Close: A "necessity" of a file-based system is the customary "Do you want to save before closing?" when an editor is closed and changes to the file have not already been saved. Although this could have been avoided in the early days of computer use it is now a standard idiom. When a file is edited it is plain for all to see that there are (at least) two copies of the file—one in memory for editing and one in the file-system. It is reasonable, since there is the possibility of discarding recent changes, to offer the user the choice of discarding the changes and to leave the copy in the file system unchanged. This also leads to the cascading into the "Save As" dialog if the new file has not been named before closing.

The naming and manipulation functions of the traditional file-based systems are not adequate for operating in object-oriented systems using transaction service where data structures have referential integrity. This is especially true when such systems are used in electronics assembly engineering applications. The inadequacy results from several differences between the typical file-system and the object-oriented database using transaction service (such as SIPLACE Pro). These differences lead to quite substantial changes in the overall appearance of the application in the object-oriented system.

From the user's point of view the object browser and the editor are combined within the client application. The tree controls that allow navigation of the object database are side by side with the editors. The result is that the user does not see the object browser.

Objects that are opened in an editor are immediately updated when changes are made—there is no copy of the object in memory.

Objects can have many names or aliases—this leads to a certain amount of ambiguity in that an ordinary user may have trouble visualizing where an object exists. Objects are in a sense omnipresent; it is only their names that have a position in the hierarchy of the tree control.

The objects within the database have referential integrity—this results in links between objects that have greater significance than their names.

Thus, a host of problems would arise if the basic functionality and menu functions of a typical file-based editor were utilized in an object-oriented database using transaction service. Therefore, it is a goal of the invention to provide naming and manipulation functions for user defined data structures in a data system using transaction service.

SUMMARY OF THE INVENTION

The present invention provides novel naming and manipulation functions for user defined data structures in a data system using transaction service. In particular, in an electronics assembly engineering system having a computer subsystem in which user-defined data structures accessible to editor software have referential integrity and in which user modifications to the data structures during editing are made directly to the data structures rather than indirectly by way of a temporary file, the invention provides a method for permitting naming and manipulation of the data structures. The method includes the steps of (i) providing close, discard and rename functions for the data structures in the case where a newly-created data structure is being edited; (ii) providing close and copy functions for the data structures if an existing data structure is being edited; and (iii) excluding a save-as function for the data structures.

The method is preferably performed by a computer subsystem within the electronics assembly engineering system, and in particular by computer-readable media in the subsystem that includes instructions stored therein for performing the functions. The data structures are typically objects, such as those found in an object-oriented database, but may be other structures, such as mark-up language documents (e.g., XML documents).

The computer subsystem employing the invention is coupled to a display and employs transacted service, wherein the data structures have referential integrity and temporary copies of data structures are not created during editing processes. In accordance with the invention, the display presents a representation of a plurality of data structures and a plurality of functions, including naming and manipulation functions. The plurality of functions displayed will not include a save-as function but do include: close, discard and rename functions if a newly-created data structure is being edited; and close and copy functions if an existing data structure is being edited. The display is preferably a graphical representation of a plurality of data structures and functions.

DETAILED DESCRIPTION OF THE INVENTION

Figure 1:
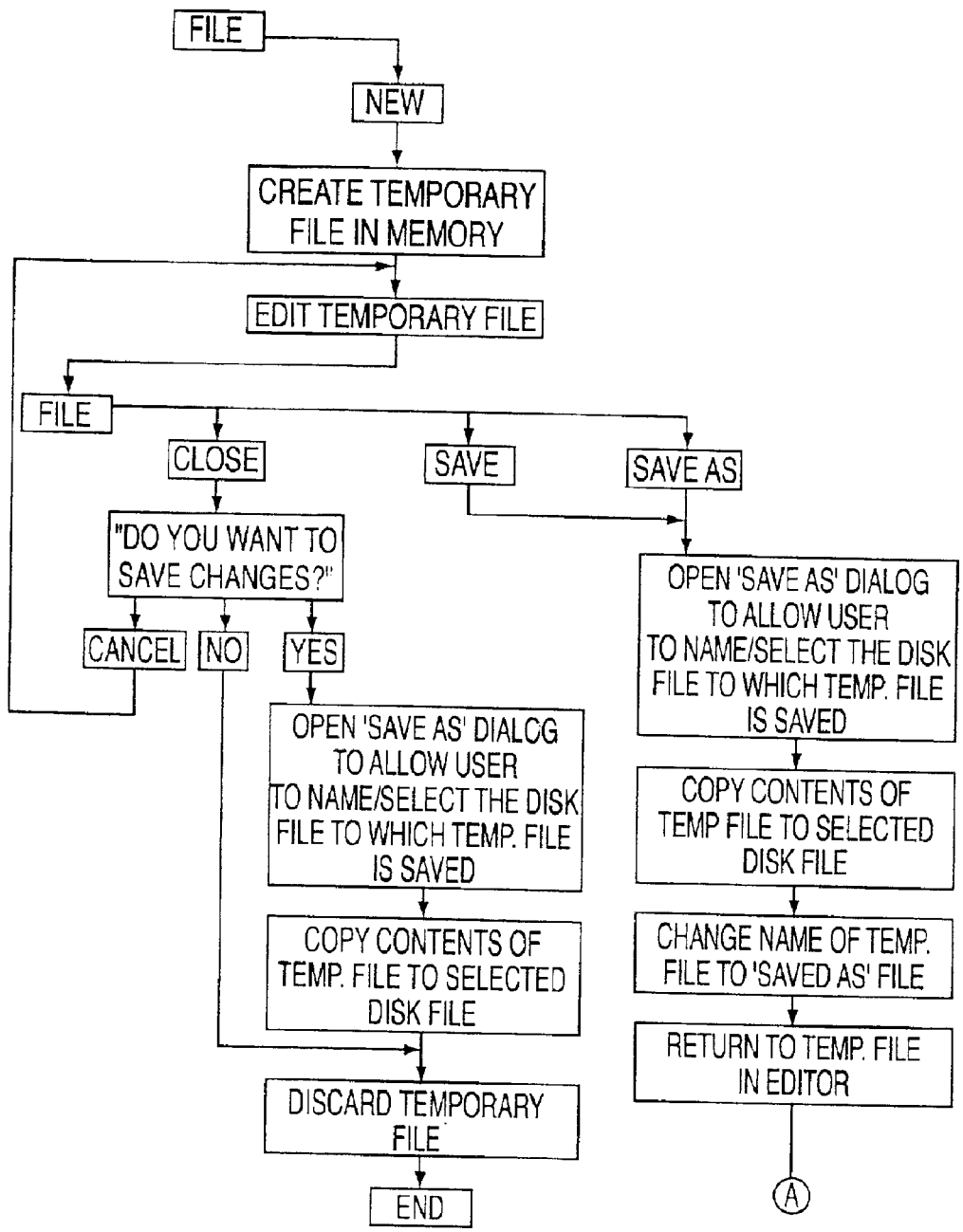
FIG. 1 shows a flowchart of the basic functionality and menu functions of a prior art file-based editor in the mode where a new file is being created.
Figure 2:
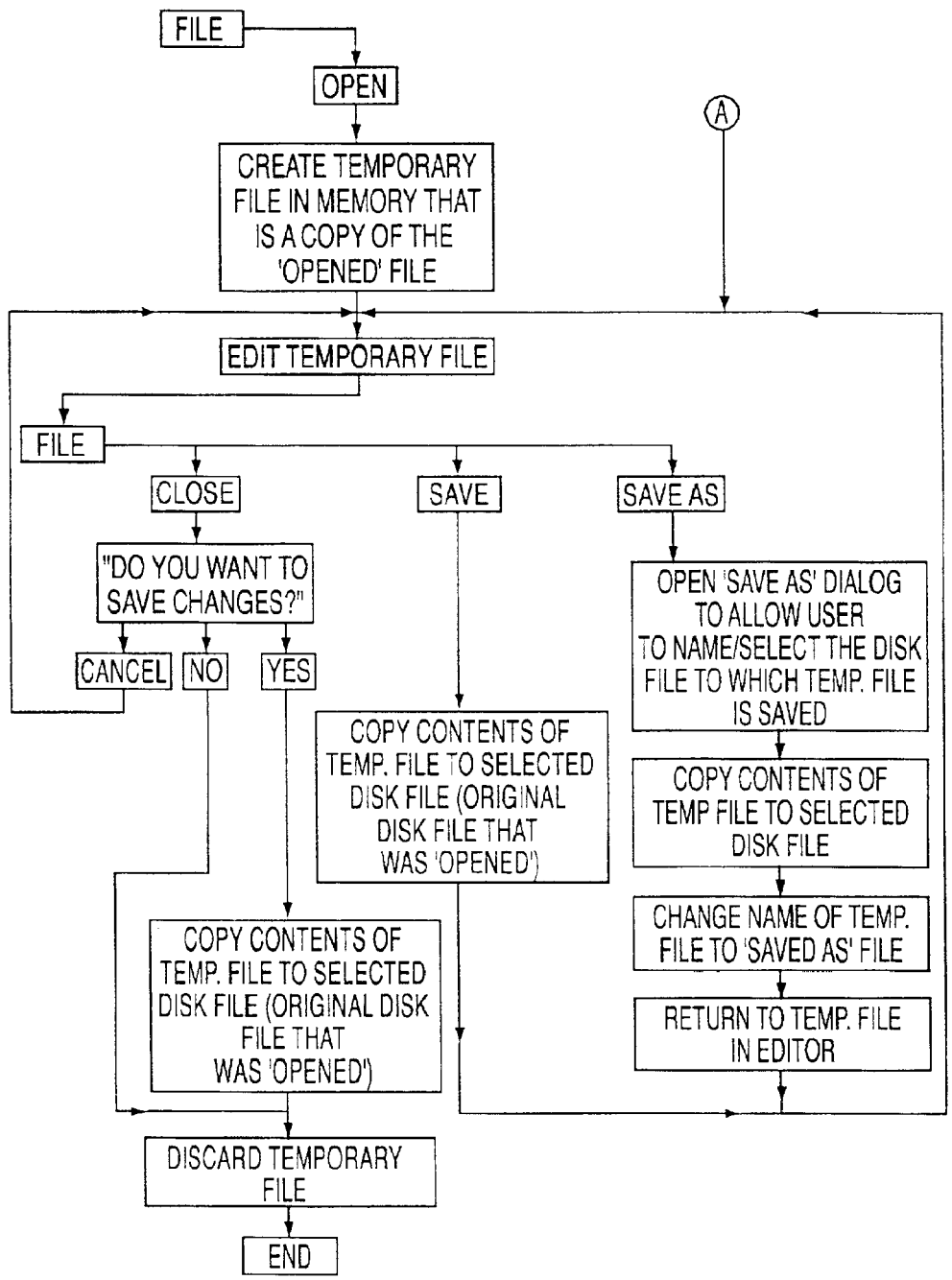
FIG. 2 shows a flowchart of the basic functionality and menu functions of a prior art file-based editor in the mode where an existing file is being edited.

As discussed in the Background above, FIGS. 1 and 2 show the basic functionality of a prior art file-based editor. Files at the left side of the figures represent the user selecting the file menu from the main menu of an application. The purpose of FIGS. 1 and 2 is to show the ambiguity of the 'Save'/'Save As' concept and how the overall functionality changes depending on whether the file is newly created or is already existing. Furthermore the 'Save'/'Save As' function allows existing files to be overwritten—leading to the reality that 'Save'/'Save As' operates as a copy function.

Figure 3:
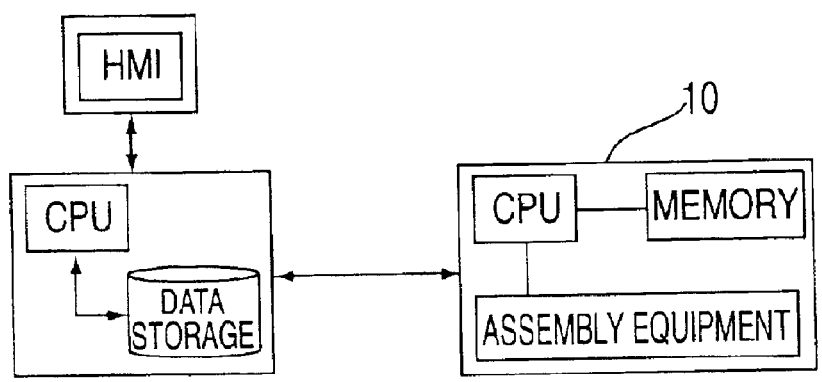
FIG. 3 shows an electronics assembly engineering system (having a CPU and data storage) coupled to an human machine interface (HMI) and to an electronics assembly system in accordance with the present invention.
Figure 4:
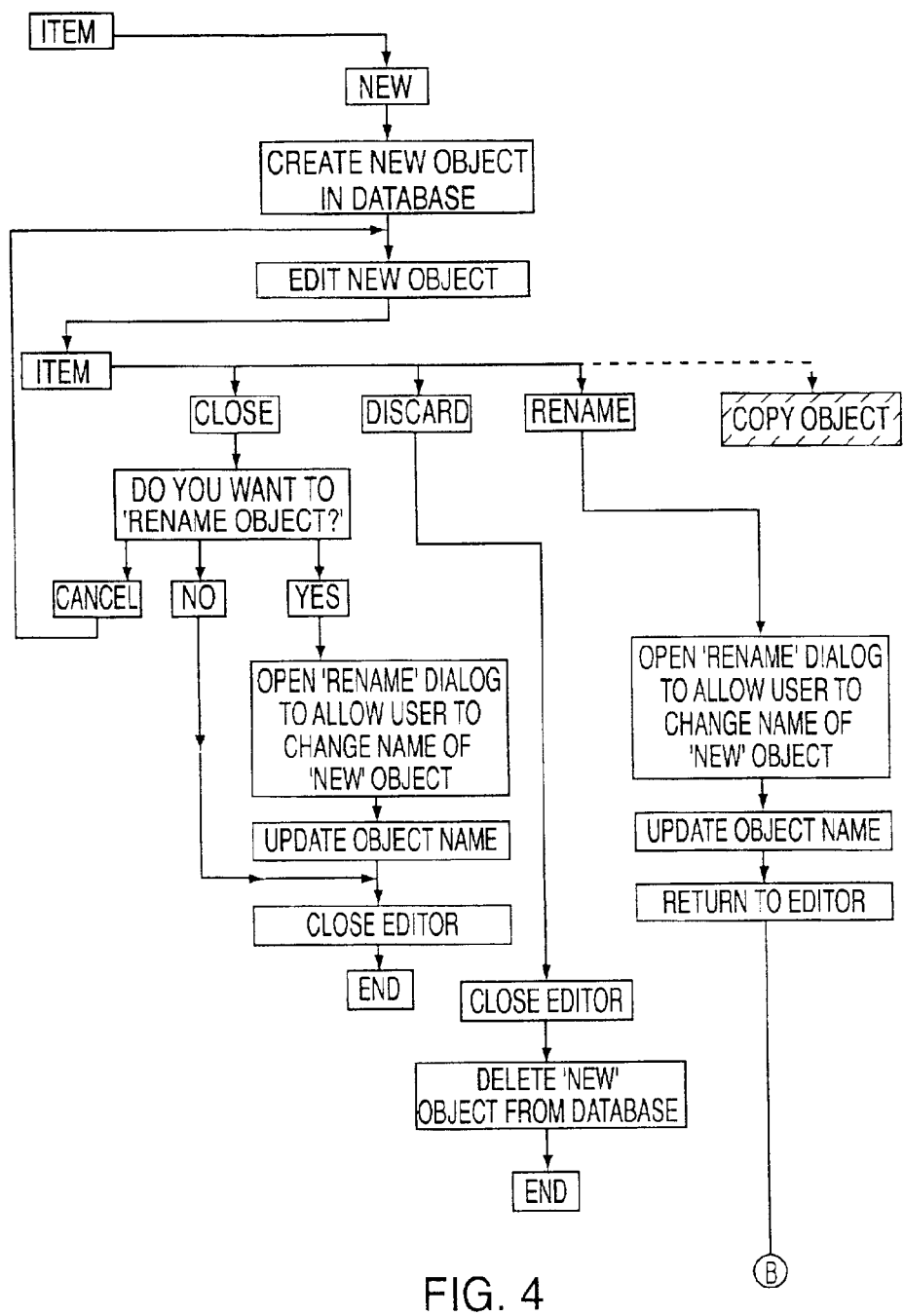
FIG. 4 shows a flowchart of the basic functionality and menu functions of an editor according to the present invention in the mode where a new object is being created.
Figure 5:
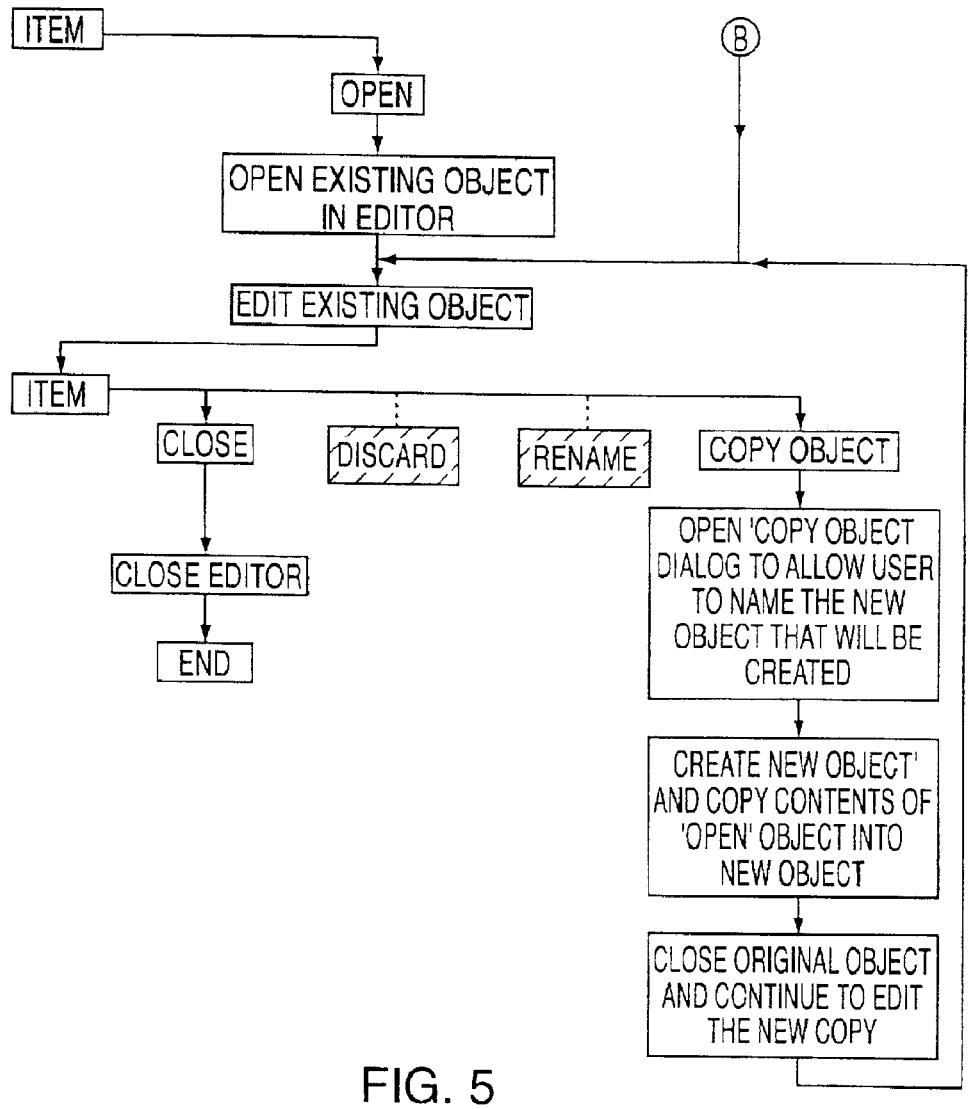
FIG. 5 shows a flowchart of the basic functionality and menu functions of an editor according to the present invention in the mode where an existing object is being edited.

FIGS. 3–5 show the electronics assembly engineering systems and the basic functionality and menu functions of an editor according to the present invention. In the embodiment described hereafter, the data structures used are objects within an object-oriented database. The figures are intended to show how the corresponding functionality of the invention is implemented in a system that uses transaction service. Using the transaction service results in all changes to an object being immediately committed to the database. Consequently, there is no need for a 'Save' function. The functions that are included are inherently modular (as can be seen by reduced cross over between function paths) and, if a function is not applicable under certain circumstances, it is merely disabled. It is critical that 'Save'/'Save As' functionality prevalent in filed-based systems is not used in this application—the substitute functions are really just object name manipulators.

The electronics assembly engineering system employing the invention is shown in FIG. 3. The figure shows the electronics assembly engineering system (having a CPU and data storage) coupled to an human machine interface (HMI) and to an electronics assembly system 10 in accordance with the present invention. The naming and manipulation functions are implemented by computer-readable media stored within the system. The menu functions of the naming and manipulation operations according to present invention are shown in FIGS. 4 and 5 and are characterized as follows:

Manipulation of Objects within the Tree Controls

Opening an object: An object can be opened in the appropriate editor by selecting it in the tree and choosing the "Open" function from the context menu or by double clicking on the object name in the tree control. The selected object would be opened in the appropriate editor.

Creating a new object: A new object of a particular type can be created by selecting an object from the tree control and choosing "new object" form the context menu. The new object with default name is created in the same folder and is opened in the appropriate editor. This differs from the file-system method of creating empty files in the same folder and not opening the editor. (The "empty object" is not completely ruled out and may be of some use in certain applications.)

Renaming an object: An object (really a particular alias of an object) can be renamed by selecting the object name in the tree-control and then selecting the text a second time or by selecting the object name and choosing the Rename function from the context menu. The name can be changed by editing the text of the display name directly.

Copying an object: In a file-system the user does not have to make any distinction between the file name and the file—they are the same thing. So when a file is copied it doesn't matter whether the user thinks of this as the file name or the contents of the file. In the systems of the invention, a distinction must be made between an object and the object's name or names. It seems to be fairly clear that if a user of the invention wants to make a copy it is the contents of the object that should be copied not the name but it is the one name of many that the user must select and then choose object copy function. The user would then navigate the tree-control to a particular folder and choose paste. What should the user expect to see now? Should the new object appear in the selected folder with the same name as the object alias that had been selected or should the new object have a system generated default name. This new object would have only one alias regardless of the number of aliases of the source.

Moving an object: There is not much of a problem with selecting an object name and dragging it to another location in the object tree. The sense of moving an object is different from that of the file system. It is only the one name for the object that is being moved. Therefore care must be taken with parallels to cut and paste, which would traditionally achieve move in a file system. This is a strange function because the cut file is in limbo (indicated by a grayed image) until it is pasted, then it disappears from the original location or until another file is copied or cut. To try to imitate cut, copy and paste behavior with objects may create some problems.

Deleting an object: An object should be deleted by selecting an object name in the object tree and the choosing the delete option form the context menu or by using the delete keyboard key. As with the previous two examples there is the possibility of ambiguity since the user could be deleting an alias from an object list of aliases or deleting the object itself The menus would become too cluttered if they provided the user with separate functions for deleting the object and the alias. Since all aliases for a given object are not immediately apparent this calls for a "View aliases" dialog to be created. The "View aliases" dialog would have the capability of adding and deleting aliases for an object.

Creating shortcuts: Creating shortcuts is not possible but multiple aliases or display names will be allowed for each object.

Viewing aliases: The aliases that an object has are not immediately visible since users will be dealing with only one alias for an object at a time. From the tree control it should be possible to select an object name and chose a "View aliases" option from the context menu. This would open a dialog that has a list of all the aliases for this object. New aliases will be able to be added, deleted and possibly edited from this dialog.

Manipulating Objects when the Editor is Open

The following sections represent possible functions of the system of the invention.

Open: An object cannot be "opened" from an open editor. There is no "Open" function in the main menu.

New: An object can be opened for the Main menu Item >New function. The user then is presented with a list of object types from which to choose. The new object is created in a default folder, since there is no context when creating an object in this way, and the new object is presented in the appropriate editor. The new object is given a default name.

Save: The use of the transaction service, and other features of the System, results in changes made to an object in an editor being immediately committed to the database making the Save function unnecessary, to the extent that including a Save function would be ambiguous.

Save As: Similarly the Save As function is also unnecessary, however the additional uses of the Save As function will be addressed separately.

Giving a new object a name: The rename dialog is used to provide the equivalent functionality of a file-system whether the rename function is especially selected or if it appears as the result of closing a newly created object without first renaming it.

Make a copy of an open object: An explicit copy object function is provided in the item menu and allows a new object to be created using the open object as a template. Similar to the file-system Save As operation, this function will open a dialog similar to rename which would allow the user to name and place the new object. The new object will remain in then editor and the original object will be closed.

Overwriting an existing object: It is still a little unclear why, in a system that allows aliases, a user would want to overwrite an existing object resulting in two identical object. Making a new copy of an existing object is clear enough if you consider that the user will then modify the copy, but it is less clear to see an advantage in overwriting. The precedent is that users may be used to doing this in file-based systems.

Close: The editor and object can generally be closed immediately—only when a newly created object is closed is it necessary to prompt the user to rename it.

Solutions within the Context of the Present Invention

With a file-based system, it is clear to the ordinary user that the name of a file, as represented in the file-system, is indistinguishable from the file itself and that shortcuts are merely link files that allow a source file to "appear" at different locations in the file-system. Users believe that the file exists at the particular location in the file-system regardless of the shortcuts. One significant difference with the naming and manipulation functions of the present invention is that the conventional "Save As" functionality is now completely redundant and would in fact be dangerous to attempt to implement because of the expectation that users would carry over from file-based systems. There needs to be new functionality that is obviously different but which allows users to be able to do the sorts of things that they could in a file-system. Hence the creation of the Open as Template function in the tree-control menu and the Copy object in the item menu of the editors.

Functions Available in the Context Menu of the Tree Controls

Open <object type>: Select object name and choose "Open <object Type> from the context menu. Or double click on an object name. The selected object will open in the appropriate editor.

Open as <object type> template: Select object name and choose "Open as <object type> template. A copy of the selected object will be created with a default name, under the current folder. The new object is opened in the appropriate editor and will be subject to conditions of a new object (see below).

The new <object type>: This option should be available when either a folder or an object is selected. A new object with a default name will be created in the selected folder and will be opened in an editor.

Cut display name: Select object name and choose "Cut display name" from the context menu. The display name is becomes grayed until it is pasted to a new folder location, when the display name is removed from the original location. The user is expected to "paste" the display name into another folder.

Copy <object type>: Select object name and choose "Copy <object type> from the context menu. The user is expected to "paste" the copied object to another location.

Paste: Because of the need to distinguish between copying an object and cutting a display name the "Paste . . . "option must itself be somewhat context sensitive. If a display name has been cut then "Paste display name" will appear, if an object has been copied then "Paste <object type>" will appear it the context menu.

Paste display name: If a folder is selected and "Paste display name" is chosen from the context menu then the display name that had been copied will now appear in the selected folder. If the display name already exists in that folder for another object then an error message should be generated. This has the end result of moving a display name form one folder to another while retaining the connection to the original object.

Paste <object type>: If a folder is selected and the "Paste<object type> is chosen for the context menu then a new object will be created that is a copy of the source object.

Viewing aliases: Select object name and choose "View aliases" form the context menu. A dialog will open containing a list of all the aliases for the selected object. This dialog is made available for a couple of reasons—to "hide" the aliasing capability from users who may not need to use aliases and to put alias handling in a context outside of the tree controls. For instance there is an ambiguity when a display name is selected and deleted—it could be that the user wants to delete the display name or it could be that the user wants to delete the object. Deleting a display name becomes a feature of the dialog, leaving Delete in the tree control for deleting the object.

Delete object: Select an object and choose "Delete object" from the context menu. The object, for which the selected display name is an alias, will be deleted.

Functions available Under Main Menu "Item"

New object: Select the function under the main menu "Item→New→<object type>". This will create a new object of the selected type with a default name in the default folder (since there is no context) and open the appropriate editor loaded with this new object.

Rename object: Select the function under the main menu "Item→Rename . . . ". The rename dialog will open which will allow a name (alias) to be entered and a folder other than a default folder to be selected. It should be possible to accept the default name and default folder by pressing OK. If a new name is entered or another folder selected than the default name is discarded.

Viewing aliases: Select the function under the main menu, "Item→view aliases . . . ". A dialog will open containing a list of all the aliases for the selected object.

Copy object: This function should only be available for an existing open object or a newly created object that has already been renamed. Select the function under the main menu "Item→Copy object". The "copy object" dialog will open which will allow a name to be entered for the new object and a folder to be selected. The new object will then remain open in the editor but the original object will close. If the original object is not closed the potential exists for many objects to remain open unnecessarily. This function is not available for a newly created object that has not been renamed because that would lead to a cascade of dialogs—one to name the new object and one to name the original.

Close: Select the function form the main menu, "Item→Close". If the open object is an existing object then the editor window and object should close immediately. If the object has been newly created and the "Rename" function has not been explicitly selected then the "Rename" dialog should open to allow the user to rename it or to accept the default name before the object is closed.

Discard: The "Discard" function has been introduced to simulate the "No: response to the "Do you want to save changes . . . ?" message that appears when a typical file-based editor is closed. Even though the message itself is redundant in the system using the invention it may be useful to allow user to discard a newly created object. Rather than subject the user to an additional question on closing a new object it is better to allow such a function to be explicitly selected. This should only be available for newly created objects that have not yet been renamed and will close the editor and delete the object. To allow the "Discard" function to be available for existing objects that have been re-opened to an editor would be creating an unusual precedent.

It is envisioned that the following additional functions may be provided in certain applications.

Overwrite: It should be possible using the main menu function "Item→Copy object . . . " to select a display name of an existing object as the name for the "new object. This would have the effect of copying the contents of the open object into the existing object whose display name was selected. This object would then be opened in the editor and the original open object would be closed. An overwrite warning message would be necessary as the original contents of the overwritten object would be lost. It seems that this could also be accomplished by "Copy object" and "Paste object" from the context menu of the tree control, although you have to wonder why, in a system that allows aliasing, you would want to have two identical objects with different sets of aliases. Why not combine the aliases into one object.

Merge: This is an ambiguous relation to the idea of overwriting an existing object with the contents of another. The idea behind a "Merge" type function would be to combine the display names of two different objects resulting in a single object. There is at least one situation where functionality like this may be useful.

Replacing Cut Copy Place functions in the context menu with Copy and Move dialogs: The Cut function is particularly bothersome because there is a sense of the thing that has been cut being in limbo until it is pasted. MS Outlook has a solution to this in that folders in the Outlook tree control cannot be cut and pasted but are instead manipulated with Copy and Move dialogs.

What is claimed is:

1. In a computer subsystem, in which user-defined data structures accessible to editor software have referential integrity, and in which user modifications to the data structures during editing are made directly to the data structures rather than indirectly by way of a temporary file, a method for permitting naming and manipulation of the data structures, the method comprising the steps of:

providing close, discard and rename functions for the data structures, if a newly-created data structure is being edited;

providing close and copy functions for the data structures if an existing data structure is being edited;

ensuring that a save-as function for the data structures is entirely excluded so as to be incapable of being executed, and employing the computer subsystem in an electronics assembly engineering system.

2. The method according to claim 1, wherein the data structures comprise objects.

3. The method according to claim 1, wherein the data structures comprise mark-up language documents.

4. The method according to claim 3, wherein the data structures comprise XML documents.

5. In a system, a computer subsystem in which user-defined data structures accessible to editor software have referential integrity, and in which user modifications to the data structures during editing are made directly to the data structures rather than indirectly by way of a temporary file, the subsystem comprising:

a computer-readable media having stored on it instructions for performing naming and manipulation functions for the data structures, the functions comprising (i) close, discard and rename functions for the data structures, if a newly-created data structure is being edited; and (ii) close and copy functions for the data structures if an existing data structure is being edited; and the functions entirely excluding a save-as function for the data structures so as to be incapable of being executed.

6. The subsystem according to claim 5, wherein the data structures comprise objects.

7. The subsystem according to claim 5, wherein the data structures comprise mark-up language documents.

8. The subsystem according to claim 7, wherein the data structures comprise XML documents.

9. The subsystem according to claim 5, wherein the computer-readable media is removable from the subsystem.

10. A computer-readable media of a computer subsystem in which user-defined data structures accessible to editor software have referential integrity, and in which user modifications to the data structures during editing are made directly to the data structures rather than indirectly by way of a temporary file, the media having stored on it instructions for performing a method for permitting naming and manipulation of the data structures, the method comprising the steps of:

providing close, discard and rename functions for the data structures, if a newly-created data structure is being edited;

providing close and copy functions for the data structures if an existing data structure is being edited; and ensuring that a save-as function for the data structures is entirely excluded so as to be incapable of being executed.

11. A computer-readable media of a computer subsystem in which user-defined data structures accessible to editor software have referential integrity, and in which user modifications to the data structures during editing are made directly to the data structures rather than indirectly by way of a temporary file, the media having stored instructions for performing naming and manipulation functions for the data structures, the functions comprising (i) close, discard and rename functions for the data structures, if a newly-created data structure is being edited; and (ii) close and copy functions for the data structures if an existing data structure is being edited; and the functions entirely excluding a save-as function for the data structures so as to be incapable of being executed.

12. In a computer system in which user-defined data structures accessible to editor software have referential integrity, and in which user modifications to the data structures during editing are made directly to them rather than indirectly by way of a temporary file, a method for permitting naming and manipulation of the data structures, the method comprising the steps of:

providing close, discard and rename functions for the data structures, if a newly-created data structure is being edited;

providing close and copy functions for the data structures if an existing data structure is being edited; and ensuring that a save-as function for the data structures is entirely excluded so as to be incapable of being executed.

13. The method according to claim 12, wherein the data structures comprise objects.

14. The method according to claim 12, wherein the data structures comprise mark-up language documents.

15. The method according to claim 14, wherein the data structures comprise XML documents.

16. A method for enabling data structure naming and manipulation functions in a computer system coupled to a display and employing transacted service, wherein the data structures have referential integrity and temporary copies of data structures are not created during editing of the data structures, the method comprising the steps of:

presenting on the display a representation of a plurality of data structures; and providing a plurality of functions for either or both of naming and manipulation of data structures, the plurality of functions entirely excluding a save-as function so as to be incapable of being executed.

17. The method according to claim 16, wherein the plurality of manipulation functions comprises providing close, discard and rename functions if a newly-created data structure is being edited.

18. The method according to claim 16, wherein the plurality of manipulation functions comprises providing close and copy functions if an existing data structure is being edited.

19. The method according to claim 16, wherein the step of presenting on the display a representation of a plurality of data structures comprises presenting a graphical representation of a plurality of data structures.

20. A method for enabling naming and manipulation functions for data structures in a computer subsystem, the computer subsystem coupled to a display and also employing transacted service, wherein the data structures have referential integrity and temporary copies of data structures are not created during editing of the data structures, the method comprising the steps of:

presenting on the display a representation of a plurality of data structures; and providing a plurality of functions for either or both of naming and manipulation of data structures, the plurality of functions entirely excluding a save-as function so as to be incapable of being executed.

21. The method according to claim 20, wherein the plurality of manipulation functions comprises providing close, discard and rename functions if a newly-created data structure is being edited.

22. The method according to claim 20, wherein the plurality of manipulation functions comprises providing close and copy functions if an existing data structure is being edited.

23. The method according to claim 20, wherein the step of presenting on the display a representation of a plurality of data structures comprises presenting a graphical representation of a plurality of data structures.

* * * * *